US006116906A

United States Patent [19]

Rifkin

[11] Patent Number: 6,116,906

[45] Date of Patent: Sep. 12, 2000

[54] COMPUTER METHOD FOR PRODUCING STICKERS FOR TOY VEHICLES

[75] Inventor: Andrew Rifkin, Palos Verdes, Calif.

[73] Assignee: Mattel, Inc., El Segundo

[21] Appl. No.: 09/136,436

[22] Filed: Aug. 18, 1998

[51] Int. Cl.[7] .............................. G09B 19/00; A63F 9/24

[52] U.S. Cl. .............................................. 434/105; 463/1

[58] Field of Search .................................. 463/1, 30, 36; 434/105, 307 R, 81; 283/96–97, 100–101, 117; 446/146, 268, 491

[56] References Cited

U.S. PATENT DOCUMENTS

| | | | |
|---|---|---|---|
| 2,494,072 | 1/1950 | Vetterli | 434/105 |
| 5,001,696 | 3/1991 | Baldwin . | |
| 5,466,502 | 11/1995 | Wilkinson et al. . | |
| 5,487,010 | 1/1996 | Drake et al. . | |
| 5,524,932 | 6/1996 | Kalisher . | |
| 5,556,339 | 9/1996 | Cohen . | |
| 5,600,563 | 2/1997 | Cannon et al. . | |
| 5,623,581 | 4/1997 | Attenberg . | |
| 5,624,265 | 4/1997 | Redford et al. . | |
| 5,636,994 | 6/1997 | Tong . | |
| 5,656,907 | 8/1997 | Chainani et al. . | |
| 5,665,952 | 9/1997 | Ziarno . | |
| 5,829,790 | 11/1998 | Phillips | 283/101 |

*Primary Examiner*—Valencia Martin-Wallace
*Assistant Examiner*—Marla A Sager
*Attorney, Agent, or Firm*—Roy A. Ekstrand

[57] ABSTRACT

A computer is operatively coupled to a printer and a monitor and includes input devices such as a keyboard and mouse. A CD-ROM disk is loaded into the computer which bears game play software cooperating with desktop publishing type operating software housed within the processor unit of the computer. The game play provided by the game software allows the user to select various design elements for printing upon peel and stick type sticker sheets using the printer. The game play further provides a preview display in which the selected object such as a toy vehicle is displayed having the selected design placed thereon.

2 Claims, 2 Drawing Sheets

FIG. 8
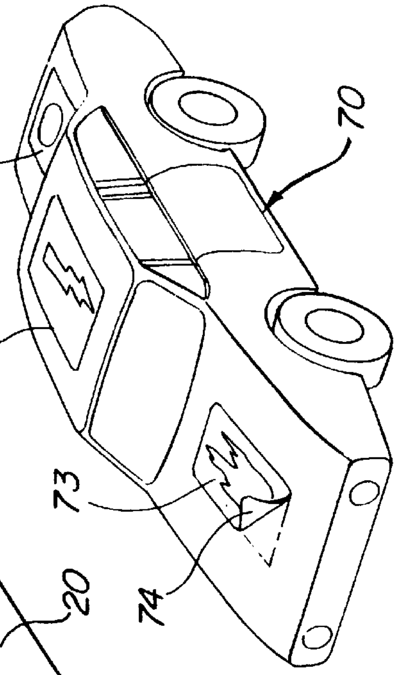
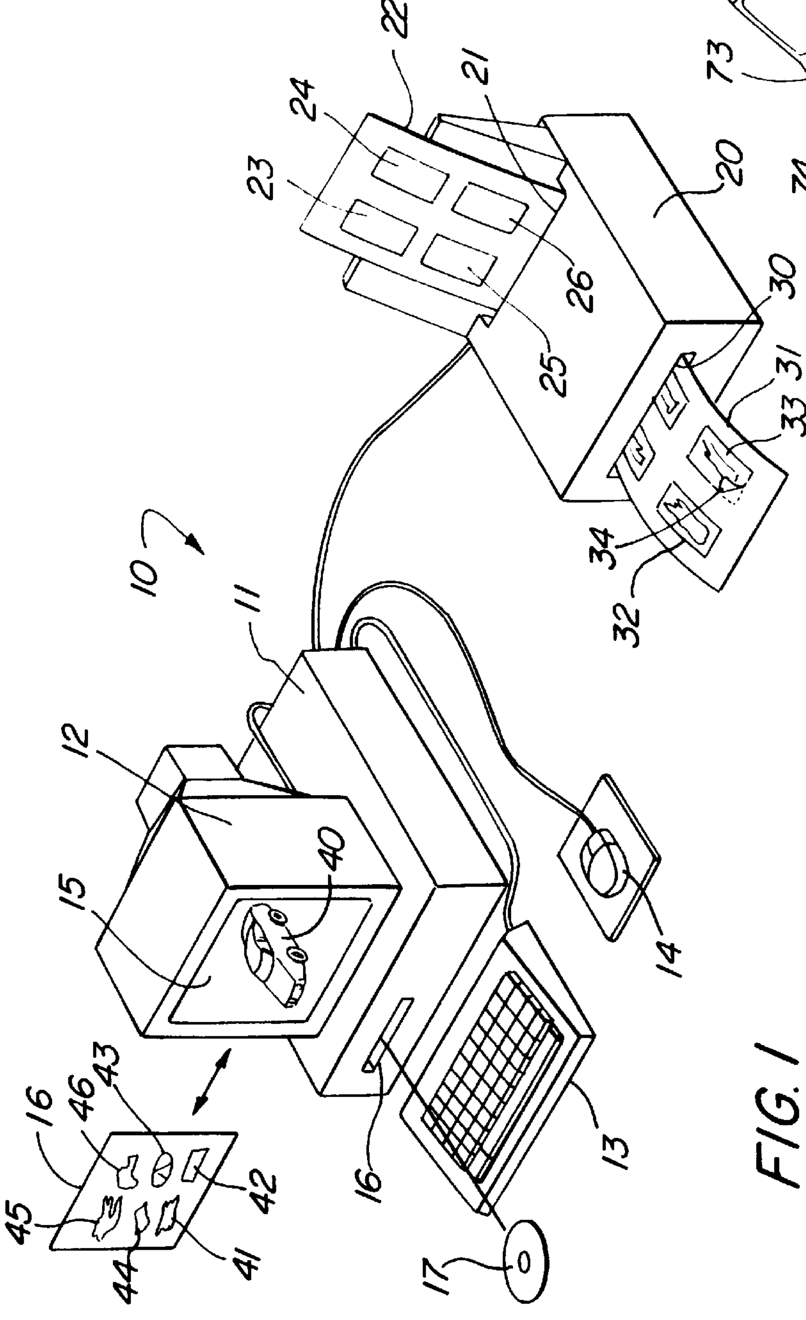
FIG. 1

COMPUTER METHOD FOR PRODUCING STICKERS FOR TOY VEHICLES

FIELD OF THE INVENTION

This invention relates generally to toy vehicle playsets and particularly to means for improving the aesthetic qualities of the playset.

BACKGROUND OF THE INVENTION

Computer systems having the ability to function in accordance with the now well known "desktop publishing" have been provided for a number of years as the power and capability of computers and printers have increased. While such systems vary somewhat, they each typically rely upon a computer having a processor unit and supporting a display monitor together with a printer. In many instances, the printer is preferably a color printer to provide a more professional looking output of printed media. Desktop publishing software may be obtained from a number of software providers which is used by the computer to create images at the user's selection upon the display monitor which are then passed to the printer for a hard copy of the selected design. A great deal of power and flexibility is provided in such systems including the ability to store a plurality of image elements for selection and inclusion into a given to-be-printed image. In most instances, the computer system utilizes a mouse device and a menu-driven software arrangement in which much of the work done to assemble the image on the display is accomplished by simple "point and click" mouse operation.

Thus, such systems are capable of providing a virtually endless variety of so-called hard copy output. While originally such systems were used entirely to print images upon paper, in recent years it has been found equally advantageous to print images upon a peel-off sticker bearing media. Thus, sheets of paper shaped in accordance with standard sheet sizes are supported adhesively upon an impervious carrier similar to conventional peel-off stickers. As these sticker sheets are passed through the printer, selected images are placed upon the stickers at the appropriate location by the desktop publishing software.

Not surprisingly, practitioners in the art have been quick to utilize this powerful type of software together with improved faster and more powerful computers to solve various problems and undertake various amusing, educational or entertaining activities. For example, U.S. Pat. No. 5,524,932 issued to Kalisher sets forth a STICKER-BASED METHODS OF MAKING A PERSONALIZED CHILDRENS' STORY BOOK using preprinted books with blank areas on various pages. A transparent sticker having personalized text thereon is applied to the blank areas to create a personalized story line in the book.

U.S. Pat. No. 5,556,339 issued to Cohen sets forth a COMPUTER PICTURE TOY FOR INFANTS AND VERY YOUNG CHILDREN which provides audio-visual stimuli directed to the creation of a picture in response to input by an infant or very young child.

U.S. Pat. No. 5,623,581 issued to Attenberg sets forth a DIRECT VIEW INTERACTIVE PHOTO KIOSK AND IMAGE FORMING PROCESS FOR SAME having a photo booth coupled to a computer for combining the subject's image with a plurality of background images and for printing multiple copies thereof.

U.S. Pat. No. 5,487,010 issued to Drake, et al. sets forth a BUMPER STICKER PRINTING MACHINE having an arcade-style enclosure, a computer board and program, a monitor and touch screen and means for feeding a succession of vinyl bumper sticker material to a printer. The customer puts money into the machine and then selects a bumper sticker style which is then printed.

U.S. Pat. No. 5,600,563 issued to Cannon, et al. sets forth a SYSTEM FOR PRINTING SOCIAL EXPRESSION CARDS having a computer system including a color printer and a monitor together with a color scanner for inputting images. The user is able to scan in an image to be used in the resulting printout of a greeting card or the like.

U.S. Pat. No. 5,001,696 issued to Baldwin sets forth a METHOD OF PREPARING AN IMAGE ACCESS CARD to be used with an image access system. The image access system utilizes a storage medium containing the images and a reference table which includes a series of reference numbers associated with the storage address of each image. A printer may be used to print a human readable representation of the image and a machine readable form of the reference number directly upon a supportive substrate.

U.S. Pat. No. 5,466,502 issued to Wilkinson, et al. sets forth a DUAL-PLY RESPOSITIONAL WINDOW PRICING LABEL SEPERABLE RECORD SHEATH for producing a vehicle window sticker for pricing and fuel economy information about a motor vehicle. The sticker may be readily positioned and repositioned on the vehicle window and finally removed from the window without leaving an adhesive residue.

U.S. Pat. No. 5,624,265 issued to Redford, et al. sets forth a PRINTED PUBLICATION REMOTE CONTROL FOR ACCESSING INTERACTIVE MEDIA having the ability to select from a variety of images for producing an interactive book.

U.S. Pat. No. 5,636,994 issued to Tong sets forth an INTERACTIVE COMPUTER CONTROLLED DOLL having a computing system controlling a doll through a sound processor and a conductive tether.

U.S. Pat. No. 5,656,907 issued to Chainani, et al. sets forth a METHOD AND SYSTEM FOR PROGRAMMING TOYS having apparatus for storing a travel direction set within the memory of a microprocessor controlled self-powered toy vehicle.

U.S. Pat. No. 5,665,952 issued to Ziarno sets forth a METHOD OF STREAMLINING THE ACKNOWLEDGEMENT OF A MULTIPLICITY OF CONTRIBUTION OR GIFT COMMITMENTS MADE AT A PLURALITY OF REMOTE LOCATIONS TO DISTRICT FUND-RAISING ORGANIZATIONS AND GIFT RECIPIENTS AND SYSTEM THEREFOR.

While the foregoing described prior art devices have improved the art and in some instances enjoyed commercial success, there remains nonetheless a continuing need in the art for evermore improved, amusing, interesting and entertaining features to utilize newly developed powerful computers for enhancing various game play.

SUMMARY OF THE INVENTION

Accordingly, it is a general object of the present invention to provide an improved computer game relating to toy vehicles. It is a more particular object of the present invention to provide an improved computer game relating to toy vehicles which is applicable to various elements of the toy vehicle playset as well.

In accordance with the present invention, there is provided a method of playing a game using a computer system having a display monitor, one or more input devices, and a printer, the method comprising the steps of: providing a toy vehicle playset object defining a plurality of surfaces; providing a plurality of material sheets having a plurality of blank sticker cutouts; displaying a toy vehicle playset object; displaying a plurality of image designs; selecting an image design for use on the toy vehicle playset object to provide a selected image design; displaying the toy vehicle playset object having the selected image design thereon; printing the selected image design upon the blank sticker cutouts to produce printed sticker cutouts; and applying one or more of the printed sticker cutouts to one or more surfaces of the toy vehicle playset object.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a computer system having a desktop publishing system stored therein together with the present invention game software being installed in a CD-ROM format;

FIG. 8 sets forth a perspective view of a toy vehicle having a plurality of printed stickers secured thereto.

DESCRIPTION OF THE PREFERRED EMBODIMENT

Figure 2:
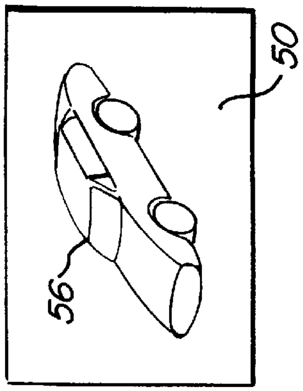
FIG. 2 sets forth an exemplary display of a selected toy vehicle prior to decoration.

FIG. 1 sets forth a perspective view of a computer system running under the control of a desktop publishing type software of conventional fabrication and generally referenced by numeral 10. Computer system 10 is further fabricated in accordance with conventional fabrication techniques and includes a processor unit 11, a monitor 12 having a display screen 15 together with a keyboard 13. For purposes of illustration, an image 40 is displayed upon screen 15. In further accordance with conventional fabrication techniques, computer system 10 includes mouse 14 operatively coupled to processor 11 in a conventional manner. A printer 20 which, in its preferred fabrication, comprises a color printer is operatively coupled to processor unit 11 and includes a stock input 21 and a printed sheet output 30.

In accordance with the present invention, a sheet of blank sticker paper 22 having cutouts for peel-off stickers 23 through 26 is shown being inputted to printer 20. Also shown in FIG. 1 is a sheet of peel-off sticker stock 31 having passed through printer 20 and having received images 32 and 33 upon the peel-off sticker portions thereof.

In operation and in accordance with the present invention, a CD-ROM disk 17 is inserted into a drive input 18. The software supported upon CD-ROM 17 forms the operational software of the present invention game by which the game play is carried forward. Once CD-ROM 17 is loaded within processor 11, computer system 10 is ready for play of the present invention game. In the preferred fabrication of the present invention game, inputs to processor 11 are provided using keyboard 13 and/or mouse 14 to display a selected vehicle image 40 upon display screen 15. Thereafter, inputs are provided to processor 11 which switch the display image upon display screen 15 to a display image 16. The display of image 16 upon screen 15 presents a plurality of design images 41 through 46. The user then operates mouse 14 to select a particular one of the images presented for eventual application to the toy vehicle corresponding to vehicle image 40 on the prior screen.

Thereafter and as is described below in FIGS. 2, 3 and 4, the user having selected a vehicle and a design to be used on stickers applicable to the vehicle implements a print cycle. In accordance with the software on CD-ROM 17, the print operation of printer 20 under control of processor 11 is formatted to correspond to the size and location of various ones of said blank stickers 23 through 26 on blank sheet 22. As printer 20 processes blank sheet 22, images such as images 32 and 33 are printed upon the peel-off sticker portions of the material sheet.

Once the desired printed stickers have been obtained, the user may then apply them to the selected toy vehicle to provide an aesthetically enhanced vehicle for a playset.

Figure 3:
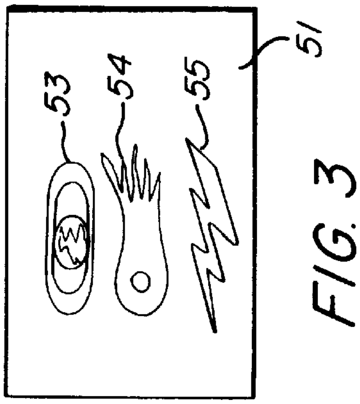
FIG. 3 sets forth a display of a selected image design which is chosen from a plurality of designs to be formed into a vehicle sticker for decorating a vehicle.
Figure 4:
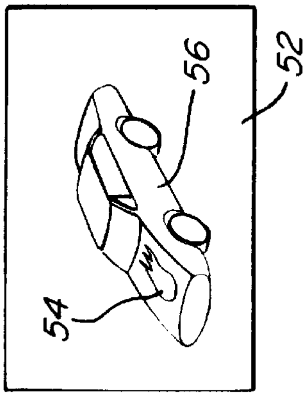
FIG. 4 sets forth a display showing the selected vehicle together with the selected designs applied thereto.

FIGS. 2, 3 and 4 set forth sequential displays in carrying forward the above-described operation of the present invention game to produce stickers which may be applied to a selected toy vehicle and which have a particular selected design. FIGS. 2, 3 and 4 depict sequential displays appearing upon display screen 15 (seen in FIG. 1).

More specifically, display 50 includes a toy vehicle 56 which has been selected by conventional selection means such as name input using keyboard 13 or point and click operation of mouse 14. The important aspect with respect to the present invention is the obtaining of a display having a suitably large and easily viewed image of the selected toy vehicle. Display 51 presents an alternative image set for display screen 15 which provides a plurality of design images such as images 53, 54 and 55 from which the user may select an image element for printing upon toy vehicle 56. Once again, in the preferred fabrication of the present invention game, mouse 14 (seen in FIG. 1) is utilized to select a particular design from among design images 53, 54 and 55.

FIG. 4 sets forth a display 52 which appears upon display screen 15 (seen in FIG. 1) having selected vehicle 56 shown together with selected design image 54. The ability of the present invention system to provide a display of the toy vehicle along with its selected design images allows the user to "preview" the aesthetic effect of utilizing a printed sticker bearing the chosen design image upon the toy vehicle. If the user prefers to relocate design 54, the user is able to click upon design 54 using mouse 14 (seen in FIG. 1) and "drag" design image 54 to a different location upon vehicle image 56. Alternatively, the user may reverse the operation and return to display 51 of FIG. 3 and select an alternate design.

The result of the selection process and the previewing of the combined displays of the selected vehicle and the selected display stickers is communication to printer 20 from processor 11 (seen in FIG. 1) to initiate the printing process. As described above, a blank sheet of peel-off sticker stock (sheet 22 in FIG. 1) is then processed within the printer to provide a plurality of stickers bearing selected image 54. The user may then peel-off each sticker in the manner shown in FIG. 1 for sticker 33 and apply the self-adhesive sticker to the intended surface of the toy vehicle. In this manner, the toy vehicle may be greatly enhanced in appearance by a plurality of images supported upon sticker material and adhering to the toy vehicle upon various surfaces thereof. In the preferred fabrication of the present invention, the adhesive used in the peel-off sticker material provides a releasible adhesive which adequately adheres to the toy vehicle surface while being releasible or peelable for easy removal and replacement by a different sticker.

Figure 5:
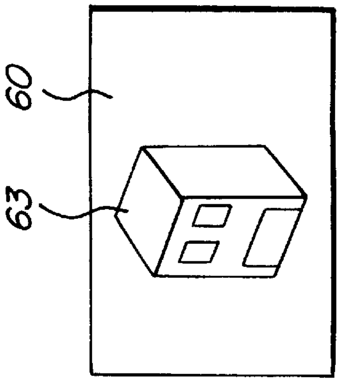
FIG. 5 sets forth a display of a selected structure to be enhanced by a sticker image.
Figure 6:
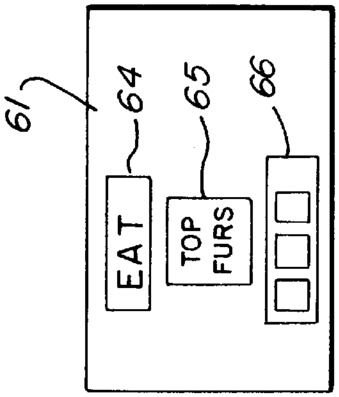
FIG. 6 sets forth a display of an image to be formed into a sticker for application to the selected structure.
Figure 7:
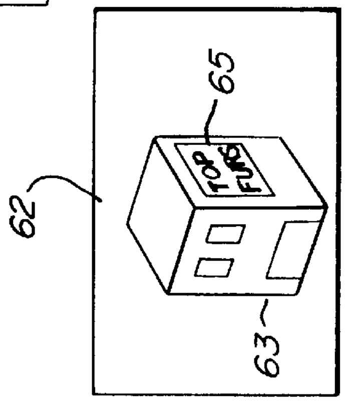
FIG. 7 sets forth a display of the selected structure having the selected display placed thereon.

FIGS. 5, 6 and 7 set forth sequential displays of the same process steps in the present invention game play operative upon a toy playset structure instead of a toy vehicle. The basic operation is substantially the same as that described above in FIGS. 2, 3 and 4. Accordingly, FIG. 5 sets forth a display 60 displayed upon screen 15 of computer system 10 (seen in FIG. 10). Display 60 includes a selected playset structure 63. After the user has selected and displayed playset structure 63, the user may then choose one or more designs to be applied as stickers to the playset structure.

FIG. 6 sets forth a display 61 which is presented upon display screen 15 of computer system 10 (seen in FIG. 1). Display 61 includes a plurality of aesthetic features suitable for application to various portions of playset structure 63. Thus, display image elements 64, 65 and 66 are shown upon display 61. The user is able through manipulation of mouse 14 (seen in FIG. 1) and a conventional point and click operation thereof to select one image from among images 64, 65 or 66.

FIG. 7 sets forth a display 62 having a playset structure 63 bearing selected image element 65. The user is now able to preview the appearance of playset structure 63 having image sticker 65 thereon to determine the desirability of printing appropriate stickers having image 65 printed thereon.

If the user elects to continue and print stickers, the user inputs a print command to processor unit 11 (seen in FIG. 1) and loads a blank sheet of peel-off sticker stock into printer 20 (also seen in FIG. 1). Following the printing process, one or more stickers bearing the selected design are available for the user and may be peeled from the stock sheet for application to playset structure 63.

FIG. 8 sets forth a perspective view of a toy vehicle 70 constructed in accordance with conventional fabrication techniques. In accordance with the invention, toy vehicle 70 has received a plurality of a self-adhesive stickers 71, 72 and 73. In further accordance with the present invention and using the process described above, stickers 71 through 73 bear selected images thereon. For purposes of illustration, sticker 73 is shown peeled upwardly at portion 74 thereof to illustrate the removal of the present invention stickers for replacement by other stickers or to return vehicle 70 to its initial appearance.

Figure 9:
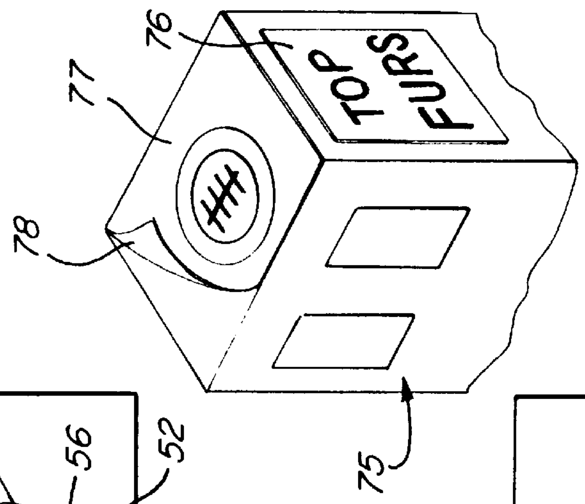
FIG. 9 sets forth a perspective view of a toy vehicle structure having a plurality of printed stickers secured thereto.

FIG. 9 sets forth a perspective view of a toy vehicle structure 75 which may be fabricated in accordance with conventional fabrication techniques. In accordance with the present invention, structure 75 supports a plurality of printed stickers 76 and 77 for enhancing the appearance of structure 75. Once again, it will be understood that stickers 76 and 77 have been printed upon blank stock in the manner described above. For purposes of illustration, a corner portion 78 of sticker 77 is shown peeled away from the underlying surface of structure 75 to show the process by which the printed stickers of the invention may be added or removed.

What has been shown is a computer game for producing stickers for toy vehicle playsets in which the user is presented with a series of displays facilitating choice of a toy vehicle or toy vehicle playset structure together with a plurality of designs each capable of being selected and printed upon one or more peelable self-adhesive stickers. In accordance with an important aspect of the present invention, the computer game provides for display of the toy vehicle or the toy vehicle playset structure having the selected sticker images placed thereon. As a result, the user is able to preview the resulting appearance of vehicle or structure choice and the selected designs for the sticker in combination.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A method of alternating a toy using a computer system having a display monitor, one or more input devices, and a printer, said method comprising the steps of:

providing a toy playset object defining a plurality of surfaces;

providing a plurality of material sheets having a plurality of blank sticker cutouts;

displaying on a display monitor a toy playset object;

displaying on a display monitor a plurality of image designs;

selecting an image design for use on said toy playset object to provide a selected image design;

displaying on a display monitor said toy playset object having said selected image design thereon;

printing said selected image design upon said blank sticker cutouts to produce printed sticker cutouts; and applying one or more of said printed sticker cutouts to one or more surfaces of said toy playset object.

2. The method set forth in claim 1 wherein said toy vehicle playset object is a toy.

* * * * *